(12) United States Patent
Laakso

(10) Patent No.: US 11,226,080 B2
(45) Date of Patent: Jan. 18, 2022

(54) OBSTRUCTION ILLUMINATOR, OBSTRUCTION ILLUMINATOR ASSEMBLY AND INSTALLATION METHOD

(71) Applicant: Obelux Oy, Helsinki (FI)

(72) Inventor: Vesa Laakso, Helsinki (FI)

(73) Assignee: Obelux Oy, Helsinki (FI)

(*) Notice: Subject to any disclaimer, the term of this patent is extended or adjusted under 35 U.S.C. 154(b) by 0 days.

(21) Appl. No.: 16/470,561

(22) PCT Filed: Dec. 20, 2017

(86) PCT No.: PCT/FI2017/050919
§ 371 (c)(1),
(2) Date: Jun. 18, 2019

(87) PCT Pub. No.: WO2018/115587
PCT Pub. Date: Jun. 28, 2018

(65) Prior Publication Data
US 2019/0338914 A1 Nov. 7, 2019

(30) Foreign Application Priority Data
Dec. 20, 2016 (EP) .................................. 16205223

(51) Int. Cl.
*F21V 5/00* (2018.01)
*F21V 5/04* (2006.01)
(Continued)

(52) U.S. Cl.
CPC ................ *F21V 5/008* (2013.01); *F21V 5/04* (2013.01); *F21V 5/043* (2013.01); *F21V 5/045* (2013.01);
(Continued)

(58) Field of Classification Search
CPC ...... F21V 5/008; F21V 23/0464; F21V 23/02; F21V 5/045; F21V 5/043; F21V 5/04;
(Continued)

(56) References Cited

U.S. PATENT DOCUMENTS 4,084,215 A 4/1978 Willenbrock
4,681,414 A * 7/1987 Hershel .................. G03F 7/702
353/102
(Continued)

FOREIGN PATENT DOCUMENTS

DE 102013110857 A1 4/2015
EP 1544460 A2 6/2005
(Continued)

*Primary Examiner* — Donald L Raleigh
(74) *Attorney, Agent, or Firm* — Laine IP Oy

(57) ABSTRACT

A robust and easy to install obstruction illuminator is herein disclosed. The obstruction illuminator features an elongated body with a first end and a second end opposing the first end. The body of the obstruction illuminator has an inner cavity, which extends between the first and second end. An artificial light source is fitted to the first end of the body and an emission lens is fitted to the second end of the body. The artificial light source is configured to emit light into the cavity towards the second end. An optical condenser element is provided into the inner cavity of the body between the artificial light source and the emission lens. The optical condenser element receives light from the artificial light source as well as condenses and directs the condensed light toward the emission lens. The emission lens refracts the light into a pattern suitable for warning about the presence of an obstacle.

19 Claims, 5 Drawing Sheets

(51) Int. Cl.
   *F21V 23/02* (2006.01)
   *F21V 23/04* (2006.01)
   *F21Y 115/10* (2016.01)
   *F21W 111/00* (2006.01)
   *F21Y 113/00* (2016.01)
(52) U.S. Cl.
   CPC .......... *F21V 23/02* (2013.01); *F21V 23/0464* (2013.01); *F21W 2111/00* (2013.01); *F21Y 2113/00* (2013.01); *F21Y 2115/10* (2016.08)
(58) Field of Classification Search
   CPC .. F21V 5/046; F21Y 2113/00; F21Y 2115/10; F21W 2111/00; Y02B 10/30
   See application file for complete search history.

(56) References Cited

U.S. PATENT DOCUMENTS

| | | | |
|---|---|---|---|
| 5,774,088 A | * | 6/1998 | Kreithen ................ A01K 15/02 342/22 |
| 6,249,375 B1 | | 6/2001 | Silhengst |
| 9,717,401 B1 | * | 8/2017 | Orringer ................ F21V 23/001 |
| 2004/0252512 A1 | * | 12/2004 | Sekiguchi ............ G02B 27/285 362/341 |
| 2007/0053203 A1 | | 3/2007 | Graham |
| 2008/0037116 A1 | * | 2/2008 | Alasaarela .............. F21V 5/046 359/433 |
| 2008/0101067 A1 | * | 5/2008 | Cariboni ................. F21V 29/80 362/245 |
| 2011/0235322 A1 | * | 9/2011 | Fields ....................... F21V 5/00 362/230 |
| 2013/0163236 A1 | * | 6/2013 | Steele ..................... F21V 21/00 362/190 |
| 2014/0252249 A1 | * | 9/2014 | Doros ..................... F21V 5/008 250/504 R |
| 2017/0158120 A1 | * | 6/2017 | McClelland ........... B60Q 3/217 |

FOREIGN PATENT DOCUMENTS

| | | |
|---|---|---|
| EP | 2112424 A | 10/2009 |
| EP | 2213876 A1 | 8/2010 |
| WO | WO2006077084 A1 | 7/2006 |
| WO | WO2014047983 A1 | 4/2014 |

* cited by examiner

OBSTRUCTION ILLUMINATOR, OBSTRUCTION ILLUMINATOR ASSEMBLY AND INSTALLATION METHOD

FIELD

The present invention relates to warning signals. In particular, the invention relates to emitting visual signals so as to issue a warning about an obstacle, such as a tall building or a wind mill. More specifically, the present invention relates to an obstruction illuminator, obstruction illuminator assembly and installation method.

BACKGROUND

Obstruction illuminators or 'obstacle lights' are widely used to mark tall or otherwise prominent constructions so as to warn aviators and navigators about the presence of an obstruction, which must be avoided. Wind power plants, for example, are so tall that they must be marked with a particular illuminated marker, which must conform to a host of regulatory standards. Indeed, a variety of different obstruction illuminators have been created for wind power plants that comply with strict requirements for the shape and intensity of the emitted light pattern.

The obstruction illuminators installed in wind power plants, for example, are exposed to harsh weather conditions, such as fluctuating and extreme temperatures, lightning, etc. In addition, the installation of the illuminators is challenging because the installation takes place quite high above ground. WO 2006/077084 A1 discloses a solution to address installation by proposing a rod-like illuminator, which is installed from inside the tower of a wind power plant through a hole, wherein the light source is located at the end of the rod-like body of the illuminator so as to extend from the tower to emit light to the environment. However, the delicate light source is thus exposed to the elements, which not only strains the LED chip but also requires a robust insulation distance etc. EP 1544460 A2, on the other hand, discloses an alternative design, in which the artificial light source is placed inside the tower to be protected from the elements. While this approach is robust, it suffers from difficult installation because the emission lens must be installed outside the tower.

Accordingly, there is a need to achieve a proper light distribution pattern with a robust obstruction illuminator that is easy to install.

SUMMARY

A novel obstruction illuminator is therefore herein proposed. The obstruction illuminator features an elongated body with a first end and a second end opposing the first end. The body of the obstruction illuminator has an inner cavity, which extends between the first and second end. An artificial light source is fitted to the first end of the body and an emission lens is fitted to the second end of the body. The artificial light source is configured to emit light into the cavity towards the second end. An optical condenser element is provided into the inner cavity of the body between the artificial light source and the emission lens. The optical condenser element comprises a collimator which receives light from the artificial light source as well as condenses and directs the condensed light toward the emission lens. The collimator emits the light in a direction parallel to the optical axis of the emission lens. The emission lens refracts the light into an oval pattern which is suitable for warning about the presence of an obstacle.

An obstruction illuminator assembly is also proposed for a similar purpose. The novel assembly includes the above described obstruction illuminator to a frame, which also hosts a power source which feeds power to the obstruction illuminator.

A method for installing an obstruction illuminator to a receiving structure, such as a wall of a wind turbine tower, is further proposed. In the method, the above described obstruction illuminator is provided and inserted from the inner volume of the enclosing structure through an opening in the structure to at least partially outside the structure. The obstruction illuminator is then secured to the structure.

The invention is defined by the features of the independent claims. Some specific embodiments are defined in the dependent claims.

Considerable benefits are gained with aid of the novel obstruction illuminator. By virtue of the novel design, the obstruction illuminator may be installed to the receiving structure from the inside, which is particularly advantageous in difficult to reach structures, such as wind turbines, tall buildings, such as bridges, etc. By positioning the artificial light source to the end of the elongated obstruction illuminator, which on the inside of or within the opening in the receiving structure, the artificial light source is protected from the ambient conditions, e.g. lightning, by the receiving structure. In addition, its location inside the receiving structure provides the freedom to include large protective components to further protect the electronics of the device, e.g. the light source. On the other hand, the artificial light source may be easily replaced from inside the structure. The collimator within the hollow obstruction illuminator body, on the other hand, provides for an effective use of the lighting power of the artificial light source. The collimator in other words enables the manipulation of the light produced by the artificial light source to be effectively guided towards the emission lens, whereby the obstruction illuminator may be built with a relatively small emission lens thus enabling installation through insertion from the inside. Such an optical arrangement enables the construction of rather long illuminators, e.g. with a body length of 15 cm, that protrude prominently from the receiving structure without compromising the light output of the device. A long body also enables use in thin steel walls and thick concrete walls alike thus expanding the versatility of the device.

BRIEF DESCRIPTION OF THE DRAWINGS

In the following, certain embodiments of the invention are described in greater detail with reference to the accompanying drawings, in which.

DETAILED DESCRIPTION OF EXEMPLARY EMBODIMENTS

Figure 1:
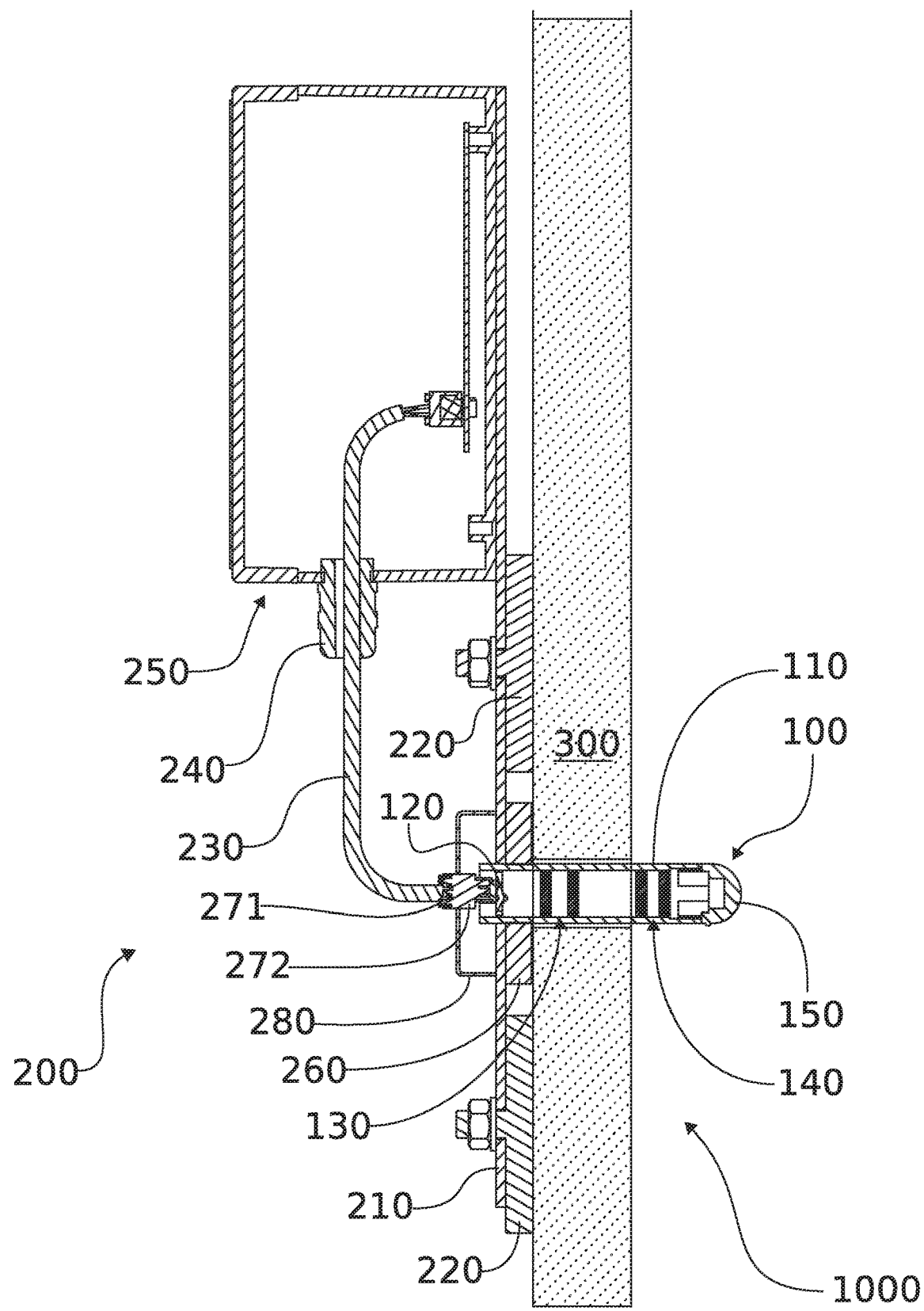
FIG. 1 illustrates a cut-out view of an installed obstruction illuminator in accordance with at least some embodiments of the present invention.

An obstruction illuminator 100 as part of an obstruction illuminator assembly 1000, which includes the illuminator 100 and an ancillary device 200 therefore, is herein disclosed. As shown in FIG. 1, an obstruction illuminator 100 according to one embodiment is to be installed to a receiving structure 300 of a tall building, e.g. a wall of a wind turbine, bridge, sky scraper, observation tower, etc., from the inside. While there may be foreseen several other applications, the present disclosure will refer to the structure as a wind turbine wall as an example. The wall 300 comprises an opening, such as a bore, for receiving the illuminator from the inside through the wall 300. No other accommodations are necessary albeit possible. The obstruction illuminator 100 has an elongated body 110, which is designed to be inserted from the inside through the opening in the wall 300 so as to extend to the ambient space outside the wall 300. At one end of the body 110, i.e. the first end, an artificial light source 120 has been fitted. When installed, the artificial light source 120 will preferably remain on the inside of the wall 300 or partly enclosed by the opening in the wall (not shown) so as to protect the artificial light source 120 from the environment outside the wall 300.

Figure 2:
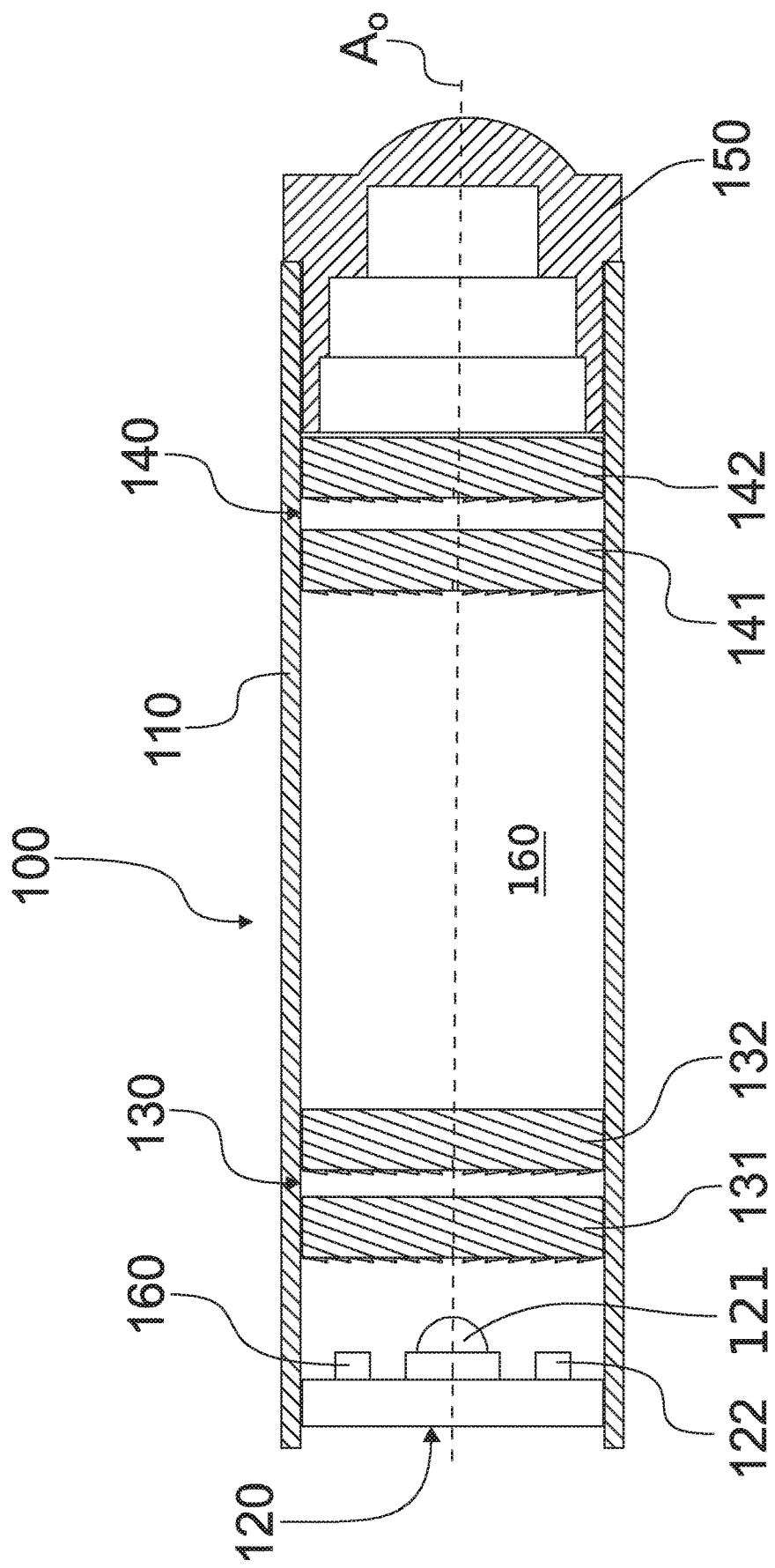
FIG. 2 illustrates a simplified and isolated cut-out view of the obstruction illuminator of FIG. 1.
Figure 3:
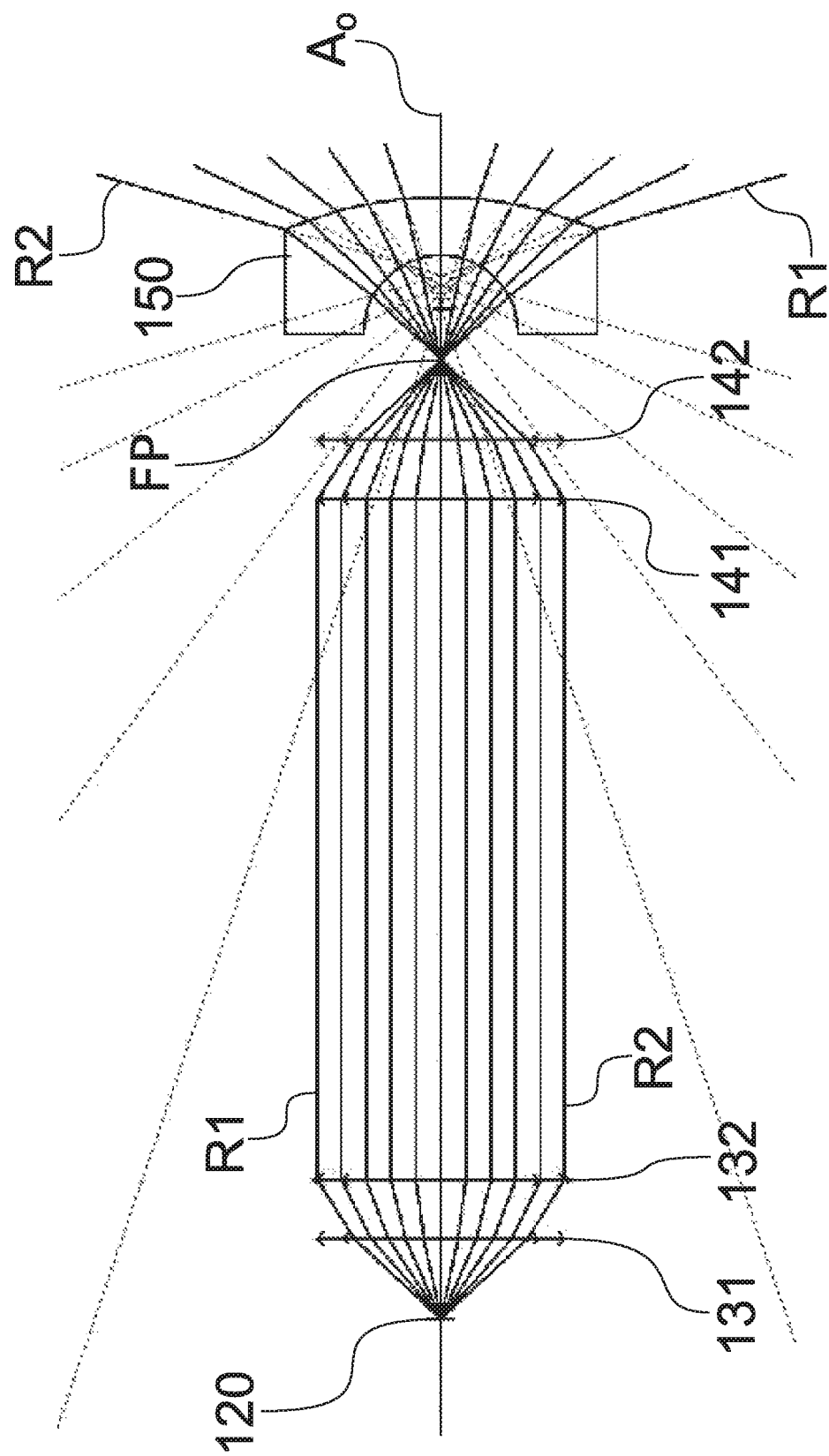
FIG. 3 illustrates light ray diagram showing the passage of light rays in the obstruction illuminator of FIG. 2.

The body 110 has an inner cavity 160, into which the artificial light source 120 is arranged to direct the produced light (FIGS. 2 and 3). The inner cavity 160 runs from the first end of the body 110 to the opposing second end of the body 110. Generally speaking, optics 130, 140, 150 have been attached to the body 110 for the handling of light rays R1, R2 produced by the artificial light source 120. An emission lens 150 has been fitted to the second end of the body 110. The emission lens 150 is designed to receive the light produced by the artificial light source 120 and to refract the light into a light pattern suitable for warning about the presence of an obstacle. The light pattern is preferably oval, when viewed axially. When installed properly, the obstruction illuminator produces an oval light pattern in the horizontal. According to one embodiment, a toroidal emission lens 150 is used to produce such a light pattern. As will become apparent here after from the disclosure in connection to FIGS. 2 and 3, the emission lens 150 receives the artificial light indirectly through an intermediate lens or a series of lenses provided to the inner cavity 160 of the body 110 between the artificial light source 120 and the emission lens 150.

Returning back to FIG. 1 it is pointed out that the obstruction illuminator 100 is installed into place by employing an ancillary device 200, which is designed to supply the obstruction illuminator 100 with power and attachment to the wall 300. Let us first consider attachment. The ancillary device 200 has a frame 210, which acts as a chassis for connecting the components of the obstruction illuminator assembly 1000 together and on the other hand connecting the obstruction illuminator 100 to the receiving structure, i.e. wall 300. The frame 210 may be, for example, a metal plate provided with simple holes for accommodating the attachment to the components of the obstruction illuminator assembly 1000.

The frame 210 may be attached to the wall 300 by employing various affixers. In the illustrated embodiment, the affixers take the form of magnets 220. If the wall 300 is made from a ferromagnetic material, such as steel or an alloy comprising steel, magnets 220 may be attached to the inside surface of the wall 300 and the frame 210 may be attached to the magnets 220 with other affixes, such as screws, rivets, adhesives, etc., or with magnets as well. In the embodiment shown in FIG. 1, the frame 210 comprises holes, through which screws are dialed into receptive openings on the magnets 220. The embodiment of FIG. 1 makes use of two magnets 220 above and below the obstruction illuminator 100. However, more of fewer magnets are foreseeable. Alternatively (not shown), the frame 210 could be attached to the inside surface of the wall 300 by gluing, welding, screwing or otherwise affixing the frame preferably without introducing a through hole to the wall 300. Attachment of the frame 210 with non-intrusive means, such as magnets, is preferred so as to maximize the integrity of the wall 300.

An attachment spacer 260 is provided to the surface of the frame 210 facing the wall 300. The attachment spacer 260 itself may be an integral part of the frame 210 or attached thereto. The attachment spacer 260 is dimensioned to fit in the gap between the frame 210 and the wall 300 provided by the magnets 220. The obstruction illuminator 100 is connected to the attachment spacer 260 through, for example, a threaded connection between the male thread on the outer surface of the illuminator body 110 and the female thread on hole of the attachment spacer 260, as shown in FIG. 1. The width of the attachment spacer 260 in the direction of the gap provides for a large contact area between the body 110 and the attachment spacer 260. Alternatively, the obstruction illuminator could be attached to a threaded hole on the frame (not shown). According to yet another alternative (not shown), the illuminator body 110 could be connected to a hole on the frame 210 via an expandable grommet, which may be dialed in to fill the gap between the two components thus affixing them to each other.

The frame 210 also hosts the power source 250, which may include the control circuits for the obstruction illuminator 100. The power source 250 is connected to the obstruction illuminator 100 through a feed cable 230, which runs through the power source enclosure by means of a grommet 240 and terminates to a connector 271 designed to fit a counterpart connector 272 on the obstruction illuminator 100. The frame 210 preferably includes a support 280 for supporting the counterpart connector 272 on the obstruction illuminator 100 so as to facilitate easy installation.

As shown in FIG. 1, optics 130, 140 are provided into the inner cavity 160 of the illuminator body 110 for manipulating the light output of the artificial light source 120 so as to format the light properly to be emitted by the emission lens 150. In the present disclosure the optics take the form of an optical condenser element. As may be seen, the first end of the body 110 includes the artificial light source 120, which in the illustrated embodiment takes the form of an LED chip. The chip receives power from the connector 272, which is presented in FIG. 1 but omitted from FIG. 2 for the sake of clarity. The LED chip may be, for example, a conventional LED chip producing light in the visible spectrum, particularly exhibiting a red or white colour. Such LED chips are known per se. According to a further embodiment shown in detail in FIG. 2, the artificial light source 120 may include a first light emitting element 121, such as an LED chip, producing light in the visible spectrum and a second light emitting element 122, such as an LED chip, producing light in the non-visible spectrum, i.e. spectrum not visible with the naked eye. Accordingly, the first LED 121 may produce red or white light, whereas the second LED 122 may produce infrared light. The two light emitting elements 121, 122 may be set into the same circuit board. This embodiment is particularly advantageous because obstruction light is seen also with night vision goggles widely used by various official aircrafts, such as boarder control and military. Unlike traditional halogen illuminators, for example, red or white LEDs do not produce light in an infrared spectrum, which is supplemented with a secondary light emitting element 122.

According to a further embodiment, a light sensor 160 is provided adjacent to the artificial light source 120 for sensing ambient light through the optics of the obstruction illuminator 100. The light sensor 160 may also be set into the same circuit board as the artificial light source 120. The light sensor 160 is preferably connected to the control logic circuit of the obstruction illuminator assembly 1000 such that the measurement data of the light sensor 160 is used to switch off the obstruction illuminator 100 in well illuminated conditions, i.e. during day-time. For this purpose the control logic circuit of the obstruction illuminator assembly 1000 may be programmed to briefly switch off the artificial light source 120 to perform the ambient light measurement with the light sensor 160.

The artificial light source 120 is designed to direct the light into the inner cavity 160 of the body 110, in which cavity 160 the path of the light rays is manipulated with optics, more specifically an optical condenser element. FIGS. 2 to 5 show one example of a suitable optical condenser element 130, 140 and the operating principle in greater detail. Generally speaking, the optics between the artificial light source 120 and the emission lens 150 is formed by an optical condenser element 130, 140, which receives light from the artificial light source 120 and condenses and directs the light toward the emission lens 150. The optical condenser element includes a collimator 130 and preferably also an objective 140. The collimator 130 and objective 140 may in turn include only one or several light path modifying elements, such as lenses. In FIGS. 2 and 3, both the collimator 130 and the objective 140 include two lenses 131, 132, 141, 142 each, whereas in FIGS. 4 and 5, both the collimator 130 and the objective 140 both include only one lens 130', 140', respectively.

Let us first consider the embodiment of FIG. 2. The light is first received by a collimator 130. The collimator 130 may be provided with a single lens or, as depicted in FIG. 2, the collimator 130 may be established by arranging two successive lenses 131, 132 into the inner cavity 160. The solitary lens (not shown) or plurality of lenses 131, 132 may be, for example, Fresnel lenses. The purpose of the collimator 130 is to receive light from the artificial light source 120, to condense the received light, and to direct the condensed light toward the emission lens 150 along the inner cavity 160. In other words, the purpose of the collimator 130 is to realign the light beam produced by the artificial light source 120 to be parallel to the axial dimension of the obstruction illuminator. In this context, the expression axial refers to the optical axis $A_o$ of the emission lens 150 of the illuminator. In the shown embodiment the body 110 of the obstruction illuminator 100 is elongated in the axial dimension. More specifically, the body 110 has a center axis in the major extending dimension thereof. On the other hand, the collimator 130 has an optical axis. In the event that the collimator 130 has several lenses, all lenses 131, 132 of the collimator 130 share an optical axis, i.e. the lenses 131, 132 are aligned. In the embodiment of FIG. 2, the center axis of the body 110 and the optical axis of the collimator 130 are co-axial. However, the optical axis $A_o$ of the emission lens 150 is—albeit parallel—deviated radially from the co-axial axes of the body 110 and the collimator 130 so as to produce a light pattern that is eccentric. The purpose of this is to direct the produced light upward from the obstacle housing the obstruction illuminator 100 such to prevent light from emitting towards the ground.

In the illustrated embodiment the collimator 130 comprises a first lens 131, which produces a first refraction to the artificial light. FIG. 3 shows how the first lens 131 contracts the opening angle of the light beam by sketching the path of two light rays, namely a first light ray R1 and a second light ray R2, which represent the peripheral light rays of a produced artificial light beam. The produced light beam is quite wide, i.e. the artificial light source 120 produces a light beam that has several light rays that have an emitting direction with a considerable component deviating from the axial dimension of the emission lens 150. To direct as much light as possible to the emission lens 150, the produced wide light beam is shaped by the collimator 130. The first lens 131 refracts the light rays R1, R2 emitting in a direction, which has a large component deviating from the axial dimension of the emission lens 150 to emit closer to the axial dimension of the emission lens 150. The second lens 132 of the collimator 130 further refracts the light so as to mitigate components of direction of the light rays R1, R2 deviating from the axial dimension of the lenses 131, 132. In other words, two lenses 131, 132 are arranged sequentially so as to perform two sequential refractions to redirect the light to emit parallel to the optical axis $A_o$ of the emission lens 150. The light outputted by the collimator 130 is preferably aligned to emit in a direction parallel or at least as parallel as possible in respect to the optical axis $A_o$ of the emission lens 150. The outputted light is then received by an objective 140. One may foresee an embodiment including more than two lenses arranged sequentially for the same purpose.

As mentioned above, the optical condenser element preferably also includes an objective 140. The purpose of the objective 140 is the opposite of that of the collimator 130; to direct or preferably focus the light to the focal point FP of the emission lens 150. The objective 140 may include a single lens or a plurality of successively arranged lenses. In the embodiment depicted in FIGS. 2 and 3 the objective 140 includes two lenses 141, 142 arranged successively along the optical axis $A_o$ of the emission lens 150. The solitary lens (not shown) or plurality of lenses 141, 142 of the objective 140 may be, for example, Fresnel lenses. The first lens 141 of the objective 140 refracts the collimated light towards the optical axis $A_o$ of the emission lens 150, wherein the light beam is contracted. The successive second lens 142 performs a second refraction guiding the light even more towards the focal point FP of the emission lens 150. In other words, the two lenses 141, 142 of the objective 140 are arranged sequentially so as to perform two sequential refractions to redirect the light to emit towards the focal point FP of the emission lens 150. One may foresee an embodiment including more than two lenses arranged sequentially for the same purpose.

The objective 140 also has an optical axis. In the event that the objective 140 has several lenses, all lenses 141, 142 of the objective 130 share an optical axis, i.e. the lenses 141, 142 are aligned. In the embodiment of FIG. 2, the center axis of the body 110 and the optical axis of the collimator 130 and the objective 140 are co-axial. However, the optical axis $A_o$ of the emission lens 150 is albeit parallel deviated radially from the co-axial axes of the body 110, collimator 130 and objective 140 so as to produce a light pattern that is eccentric. The purpose of this is to direct the produced light upward from the obstacle housing the obstruction illuminator 100 such to prevent light from emitting towards the ground. On the other hand, by making the emission lens 150 eccentric, the outer dimension of the obstruction illuminator 110 may be minimized compared to deviating a symmetric emission lens from the center axis of the body (not shown)

and/or deviating the objective and/or collimator from the center axis of the body (not shown).

Figure 4:
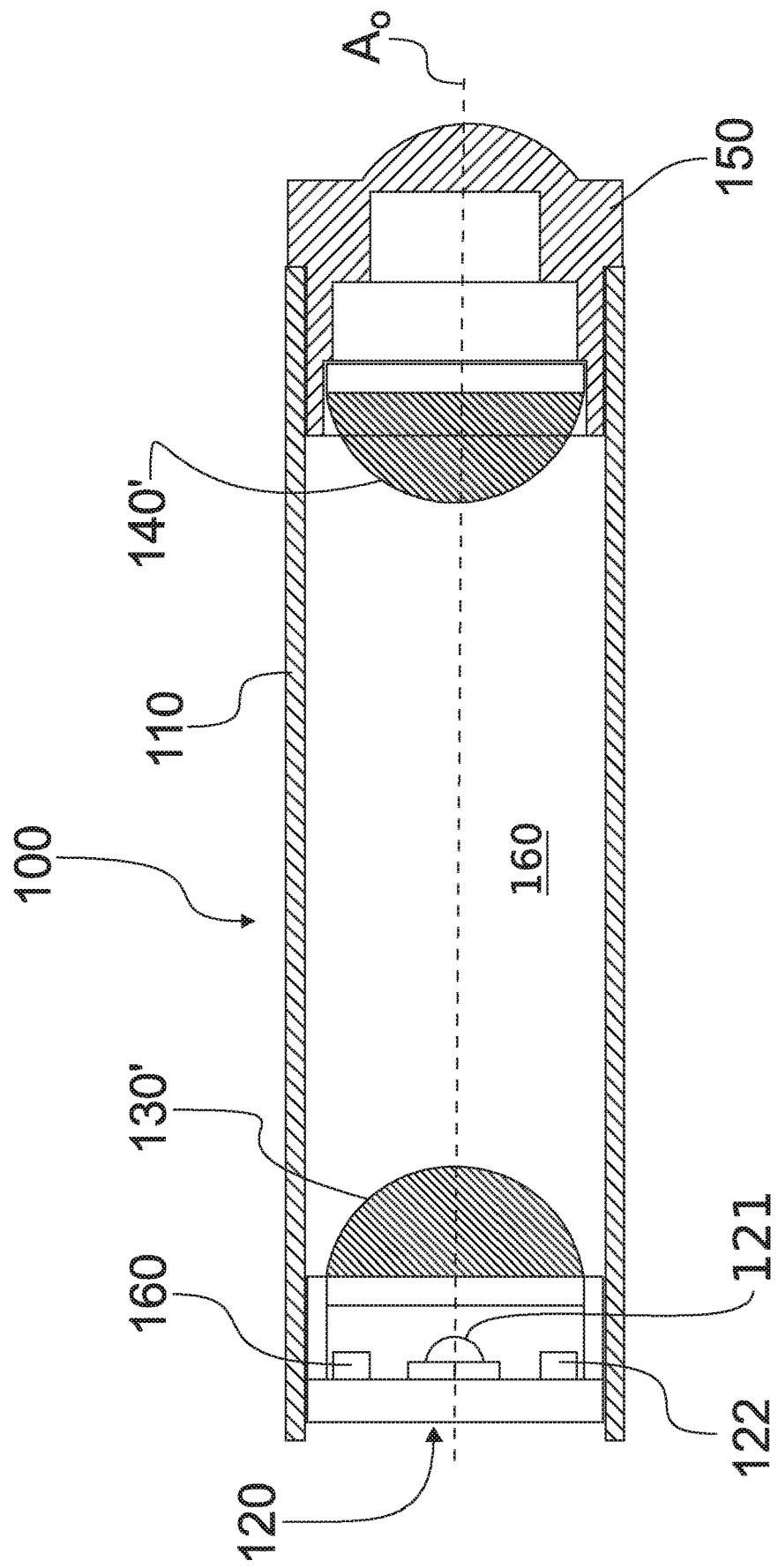
FIG. 4 illustrates a simplified and isolated cut-out view of an obstruction illuminator according to another embodiment.
Figure 5:
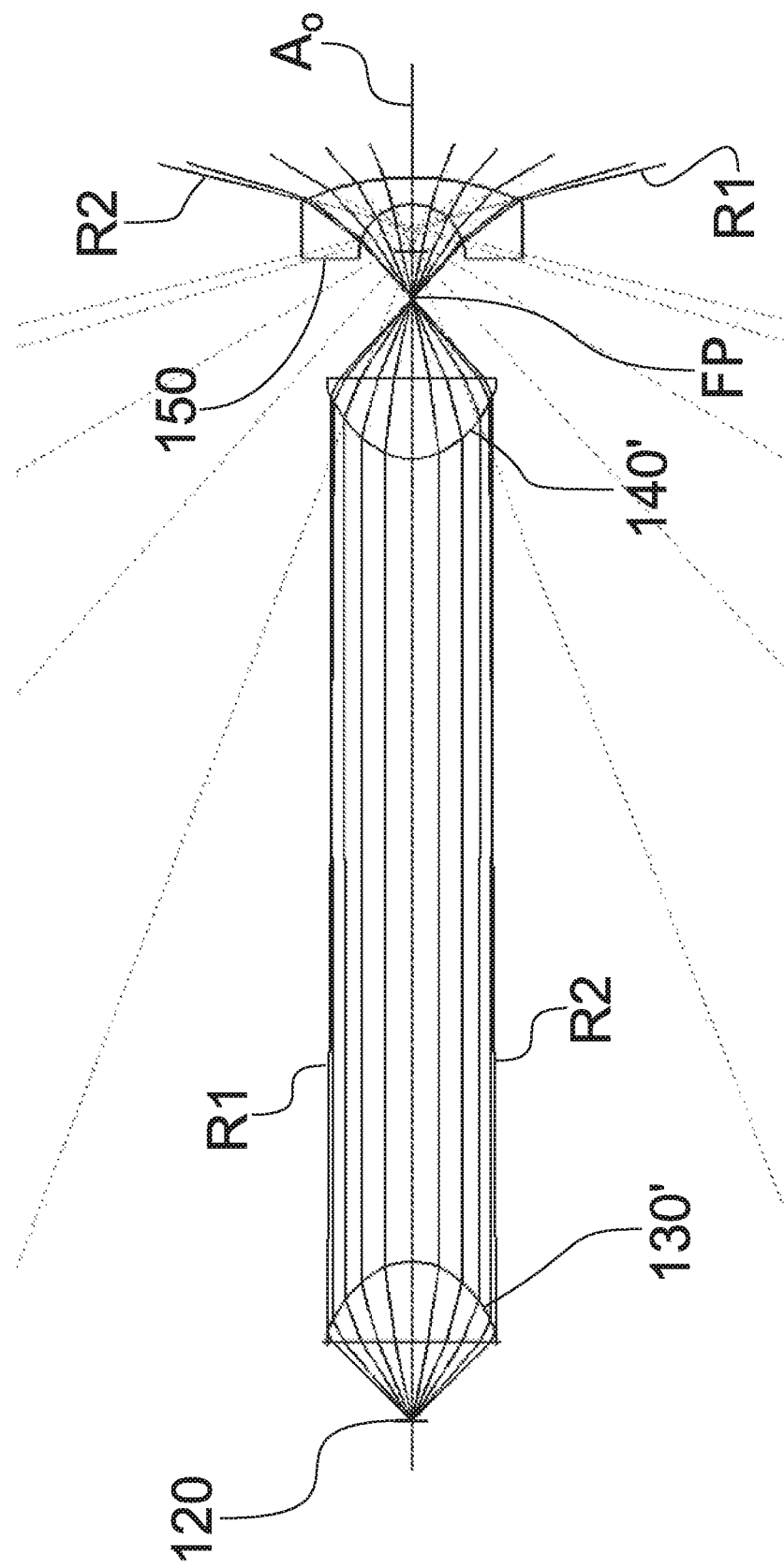
FIG. 5 illustrates light ray diagram showing the passage of light rays in the obstruction illuminator of FIG. 4.

FIGS. 4 and 5 show an alternative embodiment, wherein the collimator 130 and objective 140 each include only a solitary lens 130', 140', respectively. In the illustrated embodiment the solitary lenses 130', 140' are aspherical so as to minimize stray light rays from missing the focal point FP of the emission lens 150. As may be seen from FIG. 5, the aspherical lens 130' of the collimator 130 and the aspherical lens 140' of the objective 140' are reversed such that the light rays arriving from and being emitted to the light source 120 and emission lens 150, respectively, refract through substantially planar optical surfaces, wherein the collimator 130 and objective 140 communicate with each other through curvilinear optical surfaces.

As concerns the manipulation of light rays R1, R2, the single lens embodiment of FIGS. 4 and 5 is similar to that of the double lens embodiment of FIGS. 2 and 3. The substantially planar optical surface of the lens 130' of the collimator 130 refracts the light rays R1, R2 emitting in a direction, which has a large component deviating from the axial dimension of the emission lens 150 to emit closer to the axial dimension of the emission lens 150. The curvilinear optical surface of the lens 130' further refracts the light so as to mitigate components of direction of the light rays R1, R2 deviating from the axial dimension of lens 130'. In other words, the two optical surfaces of the aspherical lens 130' are arranged sequentially so as to perform two sequential refractions to redirect the light to emit parallel to the optical axis $A_o$ of the emission lens 150. The light outputted by the collimator 130 is preferably aligned to emit in a direction parallel or at least as parallel as possible in respect to the optical axis $A_o$ of the emission lens 150.

The reversed occurs at the objective. The curvilinear optical surface of the lens 140' refracts the collimated light towards the optical axis $A_o$ of the emission lens 150, wherein the light beam is contracted. The successive substantially planar optical surface of the lens 140' performs a second refraction guiding the light even more towards the focal point FP of the emission lens 150. In other words, the two optical surfaces of the lens 140' are arranged sequentially so as to perform two sequential refractions to redirect the light to emit towards the focal point FP of the emission lens 150.

Furthermore, it is possible to combine the embodiments of FIGS. 2 and 3 as well as 4 and 5. In other words, the dual-lens collimator 130 or objective 140 of FIGS. 2 and 3 may be replaced with a single lens collimator 130 or objective 140 of FIGS. 4 and 5, respectively, or with any alternative non-illustrated embodiment described above.

When properly set up, the majority of the light produced by the artificial light source 120 is preferably collected at the focal point FP of the emission lens 150. By arranging the collimator 130 adjacent the artificial light source 120 and the objective 140 adjacent the emission lens 150, the artificial light source 120 may be created virtually at the focal point FP of the emission lens 150. Accordingly, the construction enables the light source to the provided to the rear of the obstruction illuminator 100. The emission lens 150 may be a typical output lens used in connection with obstruction illuminators. Accordingly, the emission lens 150 is adapted to produce a suitable light distribution for obstruction lighting purposes. Such lenses are known per se.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

| REFERENCE SIGNS LIST | |
|---|---|
| No. | Part |
| 100 | obstruction illuminator |
| 110 | body |
| 120 | artificial light source |
| 121 | first light emitting element |

-continued

REFERENCE SIGNS LIST

| No. | Part |
|---|---|
| 122 | second light emitting element |
| 130 | collimator |
| 130' | aspherical lens |
| 131 | first lens |
| 132 | second lens |
| 140 | objective |
| 140' | aspherical lens |
| 141 | first lens |
| 142 | second lens |
| 150 | emission lens |
| 160 | light sensor |
| 200 | ancillary device |
| 210 | frame |
| 220 | magnet |
| 230 | cable |
| 240 | grommet |
| 250 | power source |
| 260 | attachment spacer |
| 271 | connector |
| 272 | counterpart connector |
| 280 | support |
| 300 | structure, e.g. wall |
| 1000 | obstruction illuminator assembly |
| FP | focal point |
| R1 | first ray of light |
| R2 | second ray of light |

CITATION LIST

Patent Literature

WO 2006/077084 A1
EP 1544460 A2

The invention claimed is:

1. An obstruction illuminator comprising:
an elongated body having a first end and a second end opposing the first end,
an artificial light source attached to the first end of the body and
an emission lens, which is:
provided to the second end of the body,
configured to receive light emitted by the artificial light source, and
configured to diverge the received light into an oval light pattern suitable for warning about the presence of an obstacle, wherein the light pattern is oval when viewed axially,
wherein the emission surface of the emission lens is convex, and
wherein:
the body comprises an inner cavity extending between the first and second end, wherein the artificial light source is configured to emit light into the cavity towards the second end,
the obstruction illuminator comprises an optical condenser element which comprises a collimator provided into the inner cavity of the body between the artificial light source and the emission lens, which collimator is configured to:
receive light from the artificial light source,
condense the received light, and to
collimate the condensed light toward the emission lens by emitting the light in a direction parallel to an optical axis ($A_o$) of the emission lens, and
the optical condenser element comprises an objective arranged between the collimator and the emission lens configured to receive the collimated light from the collimator and to direct the light to the emission lens.

2. The obstruction illuminator according to claim 1, wherein the collimator comprises two lenses arranged sequentially so as to perform two sequential refractions to redirect the light to emit in a direction parallel to the optical axis ($A_o$) of the emission lens.

3. The obstruction illuminator according to claim 1, wherein the lenses are Fresnel lenses.

4. The obstruction illuminator according to claim 1, wherein the collimator comprises an aspherical lens.

5. The obstruction illuminator of claim 1, wherein the emission lens is configured to increase a divergence of light from the optical axis ($A_o$) of the emission lens upon emission from the obstruction illuminator.

6. The obstruction illuminator according to claim 1, wherein the objective is configured to focus the light into the focal point (FP) of the emission lens.

7. The obstruction illuminator according to claim 1, wherein the objective is closer to the emission lens than to the collimator.

8. The obstruction illuminator according to claim 1, wherein the objective comprises two lenses arranged sequentially so as to perform two sequential refractions to redirect the light to emit towards the focal point (FP) of the emission lens.

9. The obstruction illuminator according to claim 8, wherein the lenses are Fresnel lenses.

10. The obstruction illuminator according to claim 1, wherein the objective comprises an aspherical lens.

11. The obstruction illuminator according to claim 1, wherein the emission lens is a toroidal lens.

12. The obstruction illuminator according to claim 1, wherein the obstruction illuminator comprises a terminal arranged to the first end of the body for supplying power to the artificial light source.

13. The obstruction illuminator according to claim 1, wherein the artificial light source comprises a first light emitting element emitting light in the visible spectrum and a second light emitting element emitting light in the non-visible spectrum.

14. The obstruction illuminator according to claim 1, wherein a light sensor configured to sense ambient light through the optics of the obstruction illuminator is provided adjacent to the artificial light source.

15. The obstruction illuminator according to claim 1, wherein:
the body comprises a center axis extending along the main dimension of extension of the body,
the collimator comprises an optical axis,
the objective comprises an optical axis,
the optical axes of the collimator and the objective as well as the center axis of the body are co-axial,
the optical axis ($A_o$) of the emission lens is radially translated from the co-axial optical or center axes of the collimator, objective and body, respectively, and wherein
the emission lens is eccentric in respect to the optical axis ($A_o$) thereof.

16. An obstruction illuminator assembly comprising:
a frame,
an obstruction illuminator attached to the frame, and
a power source attached to the frame and configured to feed power to the obstruction illuminator, wherein the obstruction illuminator is such defined by claim 1.

17. A method for installing an obstruction illuminator to a receiving structure enclosing an inner volume, the method comprising the steps of:
- providing an obstruction illuminator according to claim 1,
- inserting the obstruction illuminator from the inner volume of the enclosing structure through an opening in the structure to at least partially outside the structure, and
- securing the obstruction illuminator to the structure.

18. The obstruction illuminator of claim 1, wherein the artificial light source is disposed directly on the body.

19. The obstruction illuminator of claim 1, wherein a focal point (FP) of the emission lens is located between the artificial light source and the emission lens.

* * * * *